United States Patent
Miura (10) Patent No.: US 6,708,931 B2
(45) Date of Patent: Mar. 23, 2004

(54) CLAMP AND FIXING METHOD FOR TUBULAR OBJECT

(75) Inventor: Hideya Miura, Toyoake (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/331,633

(22) Filed: Dec. 31, 2002

(65) Prior Publication Data

US 2003/0136884 A1 Jul. 24, 2003

(30) Foreign Application Priority Data

Jan. 22, 2002 (JP) ........................................ 2002-012644

(51) Int. Cl.[7] .................................................. F16L 3/22
(52) U.S. Cl. ........................ 248/68.1; 248/73; 248/74.2; 248/635; 248/74.1
(58) Field of Search ........................ 248/68.1, 73, 74.2, 248/71, 74.3, 74.4, 635, 634, 55, 74.1

(56) References Cited

U.S. PATENT DOCUMENTS 5,002,243 A * 3/1991 Kraus et al. ............... 248/68.1
5,033,701 A * 7/1991 Kraus ....................... 248/68.1
5,170,984 A * 12/1992 Ruckwardt ................. 248/635
5,257,768 A * 11/1993 Juenemann et al. ........ 248/604
5,601,262 A * 2/1997 Wright ...................... 248/74.4
6,152,406 A * 11/2000 Denndou ................... 248/68.1
6,206,330 B1 * 3/2001 Oi et al. .................... 248/68.1
6,290,201 B1 * 9/2001 Kanie et al. ................ 248/636
2001/0019091 A1 * 9/2001 Nakanishi .................. 248/68.1

FOREIGN PATENT DOCUMENTS

| EP | 0597718 A1 | * | 5/1994 |
| EP | 0599662 A1 | * | 6/1994 |
| EP | 0 886 093 | | 12/1998 |
| GB | 2 166 794 | | 5/1986 |
| JP | JA0269784 | * | 10/1989 |

* cited by examiner

*Primary Examiner*—Kimberly Wood
(74) *Attorney, Agent, or Firm*—Kanesaka & Takeuchi (57) ABSTRACT

A clamp includes a clip main body having an attaching part for attaching to an attachment-receiving member, and a clamp main body having a receiving part for receiving the clip main body and a holding part for holding a tubular object. A vibration-proofing member formed of a soft material is provided on an outer perimeter of the attaching part of the clip main body.

11 Claims, 11 Drawing Sheets

CLAMP AND FIXING METHOD FOR TUBULAR OBJECT

BACKGROUND OF THE INVENTION AND RELATED ART STATEMENT

The invention relates to a clamp for attaching a tubular object such as a pipe and a tube to an attachment-receiving member such as an automobile body, and a fixing method for fixing the tubular object to the attachment-receiving member using the clamp.

As a conventional example, a clamp having a vibration-proofing function is disclosed in Japanese Utility Model No. 2543371. The clamp includes a clamp member and the first and second vibration-proofing members. The clamp member has the first and second clamping pieces connected via a hinge part, and the first and second clamping pieces are provided with attaching parts for attaching to a vehicle body (attachment-receiving part). The first and second vibration-proofing members are formed of a soft material integrated with the first clamping piece and the second clamping piece, respectively, so that a tubular object is positioned and held inside concave parts of the vibration-proofing members when the first clamping piece and the second clamping piece are placed in an attached state.

In the above conventional clamp, the concave parts of the first and second clamping pieces have a fixed diameter. Thus, it is necessary to manufacture various clamping pieces according to various diameters and pitches of the tubular objects to fix. Whenever the diameter or the pitch of the tubular objects is changed, a new one needs to be manufactured.

Also, since the clamp member directly contacts the vehicle body, vibrations of the vehicle body are easily transmitted to the tubular objects via the clamp member, resulting in poor vibration-proofing effect.

This invention has been made in order to eliminate inconveniences such as the above. An object of the invention is to provide a clamp, and a fixing method for fixing a tubular object to an attachment-receiving member using the clamp with an assured vibration-proofing effect. Even when a diameter or a pitch of the tubular object changes, it can be adapted by manufacturing only the clamp main body.

Further objects and advantages of the invention are apparent from the following description of the invention.

SUMMARY OF THE INVENTION

A clamp of the present invention includes a clip main body having an attaching part for attaching to an attachment-receiving member, and a clamp main body having a receiving part for receiving the clip main body and a holding part for holding a tubular object. A vibration-proofing or vibration-preventing member formed of a soft material is provided on an outer perimeter of the attaching part of the clip main body.

It is preferable that the vibration-proofing member be integrated with the attaching part. Further, the receiving part may have an opening provided on a side thereof facing the attachment-receiving member such that a part of the vibration-proofing member protrudes from the opening to contact the attachment-receiving member.

In a fixing method for fixing a tubular object of this invention, a clamp is used to fix the tubular object. The clamp has a clip main body having an attaching part for attaching to an attachment-receiving member, and a clamp main body having a receiving part for receiving the clip main body and a holding part for holding the tubular object. When the tubular object is fixed to the attachment-receiving member with the clamp, a clamp main body fitting the tubular object is selected, and the clip main body is received in the receiving part of the clamp main body.

Also, it is desirable that a vibration-proofing member formed of a soft material be provided on an outer perimeter of the attaching part of the clip main body. It is preferable that the vibration-proofing member be integrated with the attaching part. Further, the receiving part may have an opening provided on a side thereof facing the attachment-receiving member such that a part of the vibration-proofing member protrudes from the opening to contact the attachment-receiving member.

DETAILED DESCRIPTION OF PREFERRED EMBODIMENTS

Figure 1:
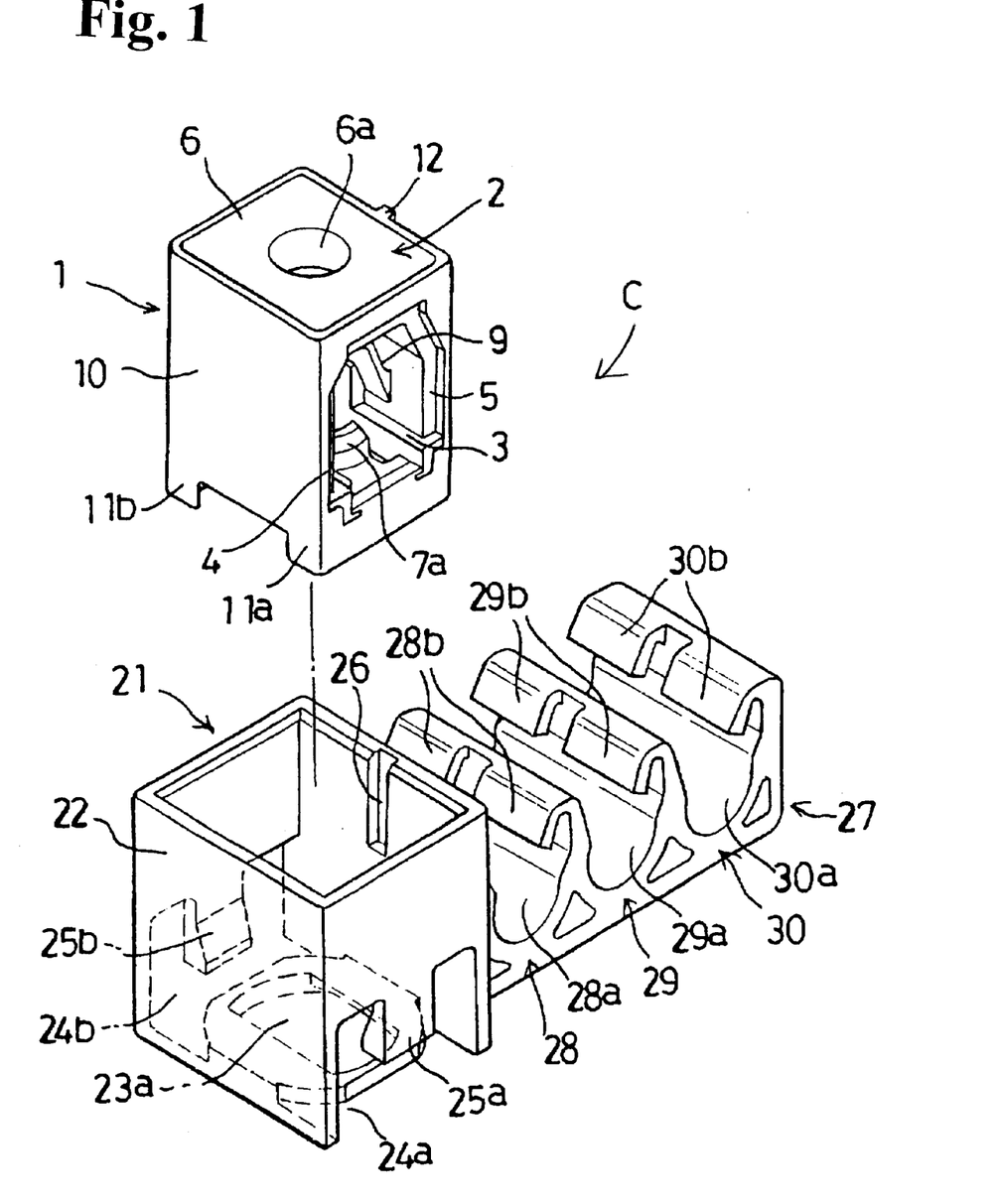
FIG. 1 is a disassembled perspective view of a clamp according to an embodiment of the invention.

Hereunder, embodiments of the present invention will be explained with reference to the accompanying drawings. FIG. 1 is a disassembled perspective view of a clamp according to an embodiment of the invention. In FIG. 1, a clamp C is formed of a clip main body 1 and a clamp main body 21.

Figure 2:
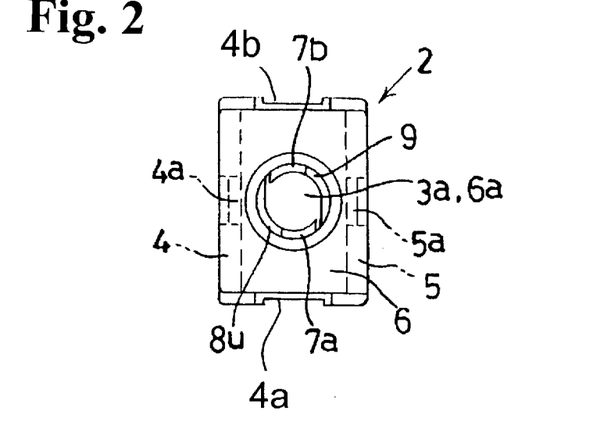
FIG. 2 is a plan view of an attaching part constituting a clip main body shown in FIG. 1.
Figure 3:
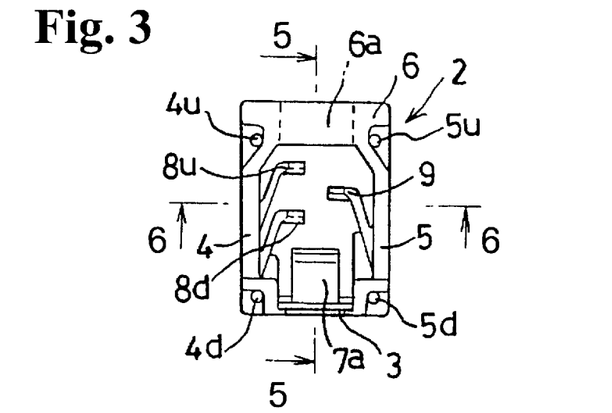
FIG. 3 is a front view of the attaching part constituting the clip main body shown in FIG. 1.
Figure 4:
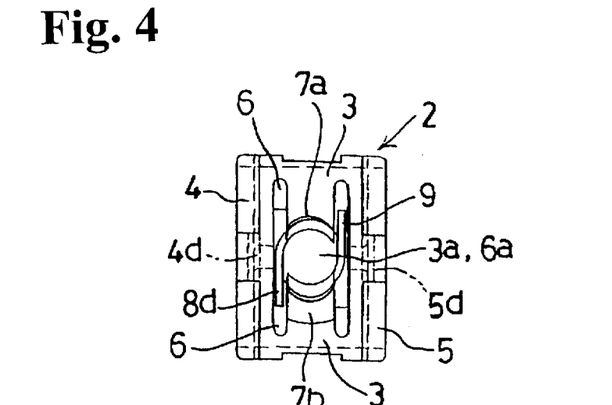
FIG. 4 is a bottom view of the attaching part constituting the clip main body shown in FIG. 1.
Figure 5:
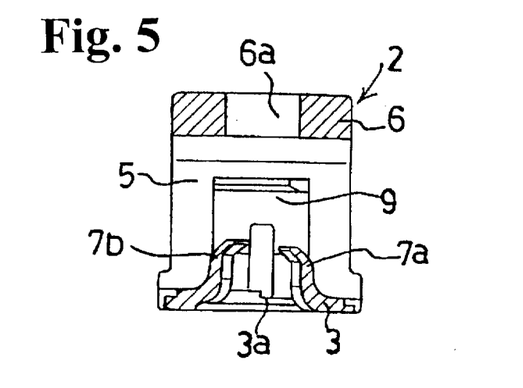
FIG. 5 is a sectional view taken along line 5—5 in FIG. 3.
Figure 6:
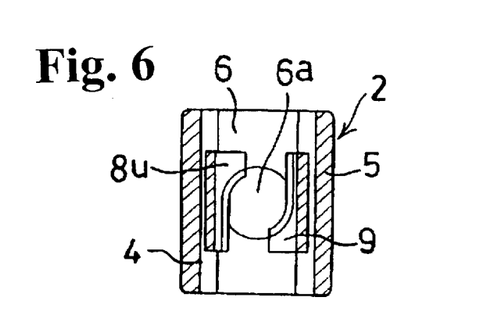
FIG. 6 is a sectional view taken along line 6—6 in FIG. 3.

FIG. 2 is a plan view of an attaching part constituting the clip main body shown in FIG. 1. FIG. 3 is a front view of the attaching part constituting the clip main body shown in FIG. 1. FIG. 4 is a bottom view of the attaching part constituting the clip main body shown in FIG. 1. FIG. 5 is a sectional view taken along line 5—5 in FIG. 3. FIG. 6 is a sectional view taken along line 6—6 in FIG. 3.

In these drawings, the clip main body 1 is formed of an attaching part 2 made of a synthetic resin, for example a hard synthetic resin such as polypropylene or polyacetal, for attaching to an attachment-receiving member, for example an automobile body B, and a vibration-proofing or preventing member 10 made of a soft material (an elastic material), for example thermoplastic elastomer, which is integrated with an outer perimeter of the attaching part 2.

As shown in FIG. 2 to FIG. 6, the above-mentioned attaching part 2 is formed of a bottom part 3 having a rectangular or oblong hole or opening 3a; sidewall parts 4, 5 disposed on edges of the bottom part 3 and facing opposite to each other parallel to a long side of the opening 3a; and a ceiling part 6 disposed so as to connect upper end parts of the sidewall parts 4, 5, and having a hole 6a such that a part of a stud bolt S (described later) penetrates through. Side openings 4a, 4b are formed on the other side portions.

Also, on the bottom part 3, as shown in FIG. 2 to FIG. 5, engagement claws 7a, 7b are disposed at the opening 3a facing each other so as to extend upward parallel to the long side of the opening 3a around the hole 6a in the ceiling part 6.

Through-holes 4u, 4d, 5u, 5d are disposed above and below outside portions of the above-mentioned sidewall parts 4, 5, as shown in FIG. 2 to FIG. 4. When molding the vibration-proofing member 10, the soft material flows though the through-holes and hardens to fix the vibration-proofing member 10 to the attaching part 2, i.e. to integrate the vibration-proofing member 10 with the attaching part 2.

Also, as shown in FIG. 2 to FIG. 6, engagement claws 8u, 8d, 9 are disposed inside the sidewall parts 4, 5, facing each other so as to extend upward perpendicular to the long sides of the opening 3a around the hole 6a in the ceiling part 6.

The engagement claws 8u, 8d are provided on the sidewall part 4, and the engagement claw 9 is provided on the sidewall part 5. A tip of the engagement claw 9 is positioned in the height direction between tips of the engagement claws 8u, 8d.

Figure 7:
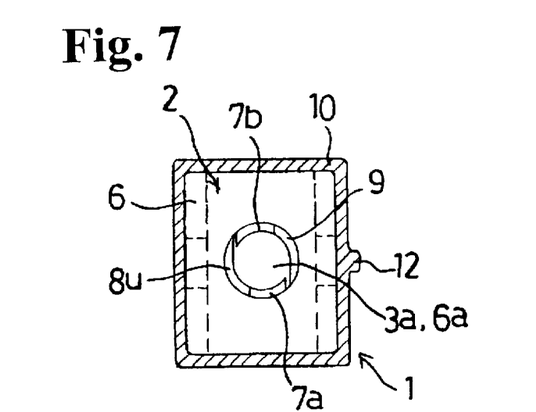
FIG. 7 is an explanatory plan view of the clip main body shown in FIG. 1.
Figure 8:
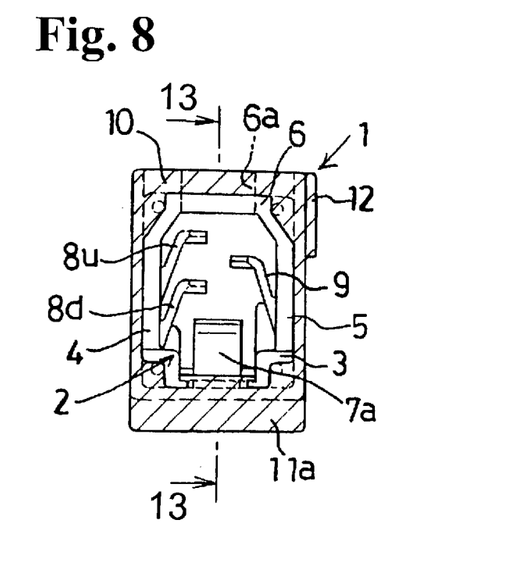
FIG. 8 is an explanatory front view of the clip main body shown in FIG. 1.
Figure 9:
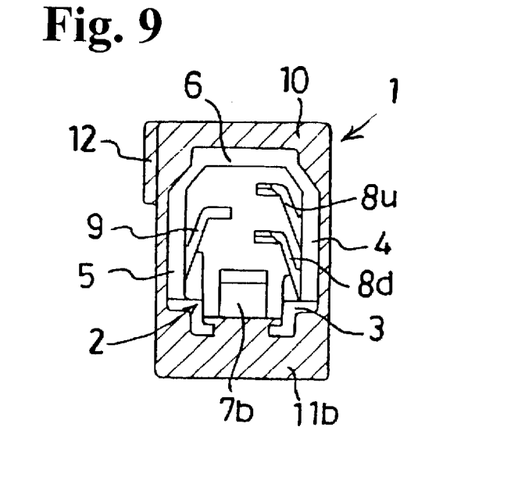
FIG. 9 is an explanatory rear view of the clip main body shown in FIG. 1.
Figure 10:
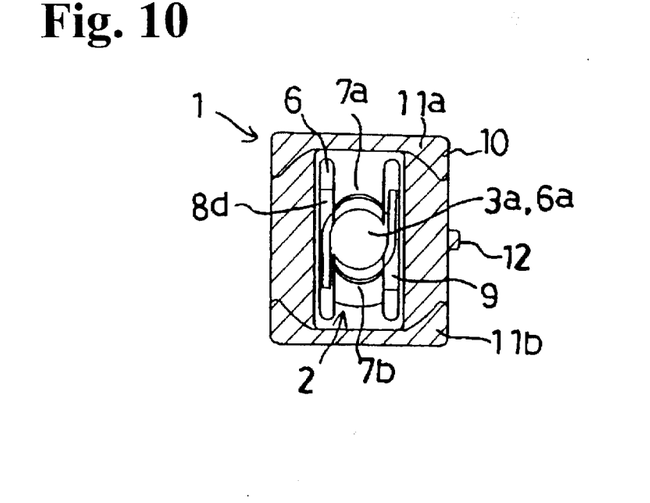
FIG. 10 is an explanatory bottom view of the clip main body shown in FIG. 1.
Figure 11:
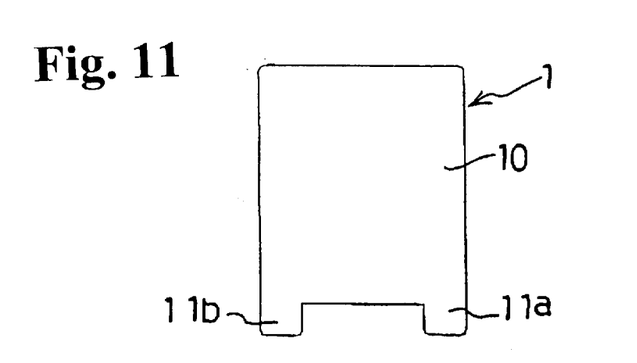
FIG. 11 is a left side view of the clip main body shown in FIG. 1.
Figure 12:
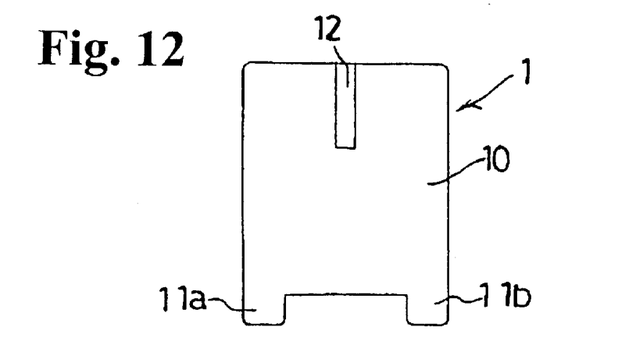
FIG. 12 is a right side view of the clip main body shown in FIG. 1.
Figure 13:
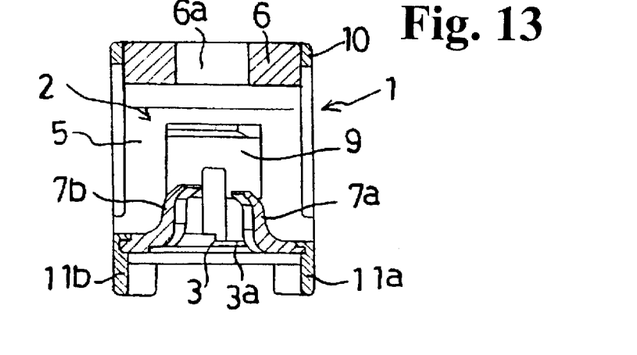
FIG. 13 is a sectional view taken along line 13—13 in FIG. 8.

FIG. 7 is an explanatory plan view of the clip main body shown in FIG. 1. FIG. 8 is an explanatory front view of the clip main body shown in FIG. 1. FIG. 9 is an explanatory back view of the clip main body shown in FIG. 1. FIG. 10 is an explanatory bottom view of the clip main body shown in FIG. 1. FIG. 11 is a left side view of the clip main body shown in FIG. 1. FIG. 12 is a right side view of the clip main body shown in FIG. 1. FIG. 13 is a sectional view taken along line 13—13 in FIG. 8.

In FIG. 7 to FIG. 10, a hatch mark is applied to the vibration-proofing member 10, which is molded on the attaching pert 2 shown in FIG. 2 to FIG. 6, to be distinguished.

In these drawings, a soft material is molded on the outer perimeter of the attaching part 2 to integrally form the vibration-proofing member 10 such that the vibration-proofing member 10 contacts an inner surface of the receiving part 22 when the clip main body 1 is received in the receiving part 22 of the clamp main body 21.

As shown in FIG. 7 to FIG. 13, the vibration-proofing member 10 is formed to cover an area excluding the opening 3a in the bottom part 3, side surfaces (openings) facing each other between the sidewall parts 4, 5, and the ceiling part 6. Upper and lower parts of side surfaces facing each other between the sidewall parts 4, 5 are connected, and a part of an upper side (a surface opposite to the ceiling part 6) of the bottom part 3 is covered. Furthermore, on a lower surface, leg parts 11a, 11b are provided to face each other perpendicular to the sidewall parts 4, 5 at the edges of the bottom part 3. On the corresponding outside surface of the sidewall part 5, a rail 12 for aligning is provided at the center of the circumferential direction in a specified length from the upper end.

Figure 14:
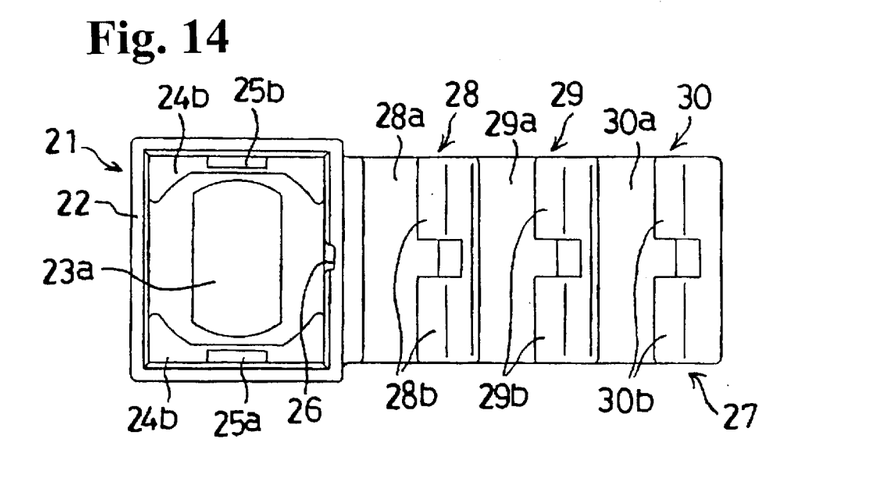
FIG. 14 is a plan view of the clamp main body shown in FIG. 1.
Figure 15:
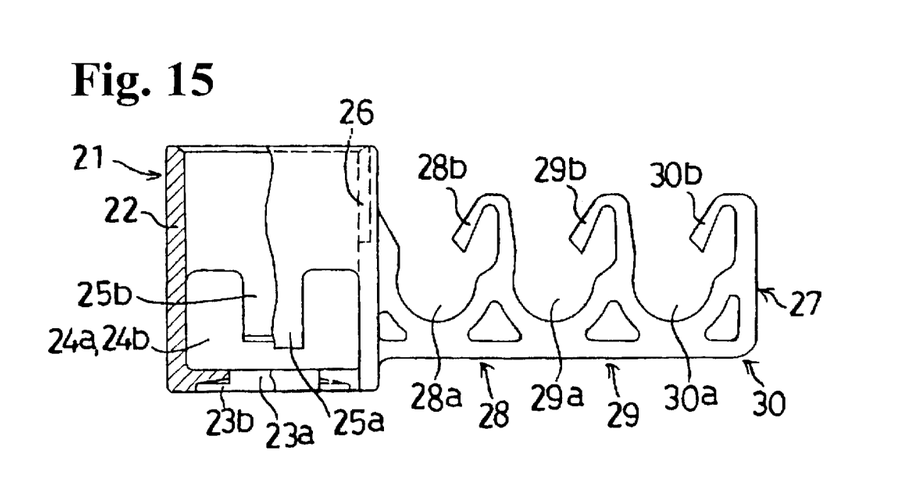
FIG. 15 is a partially cut front view of the clamp main body shown in FIG. 1.
Figure 16:
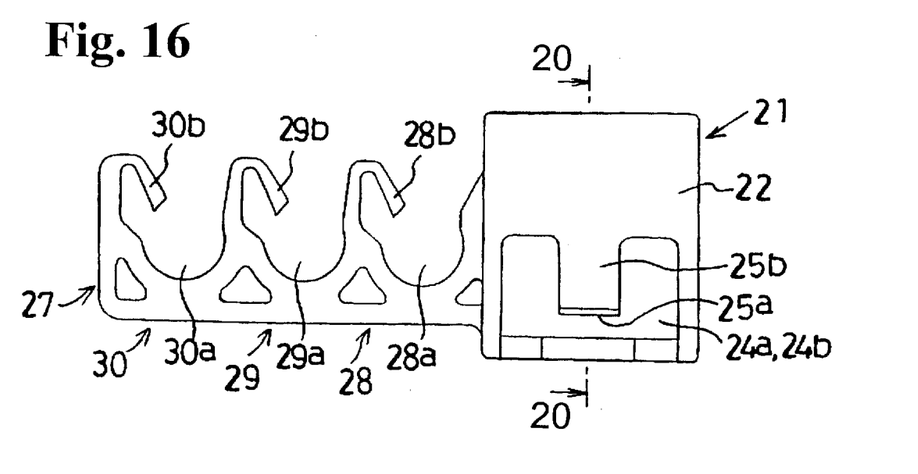
FIG. 16 is a rear view of the clamp main body shown in FIG. 1.
Figure 17:
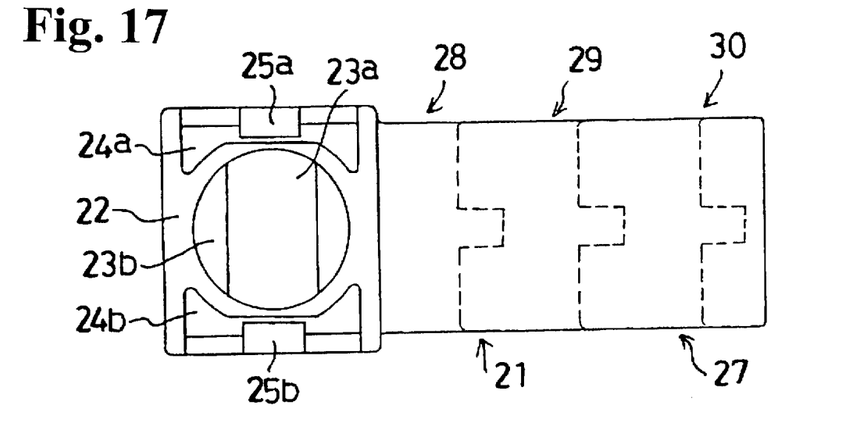
FIG. 17 is a bottom view of the clamp main body shown in FIG. 1.
Figure 18:
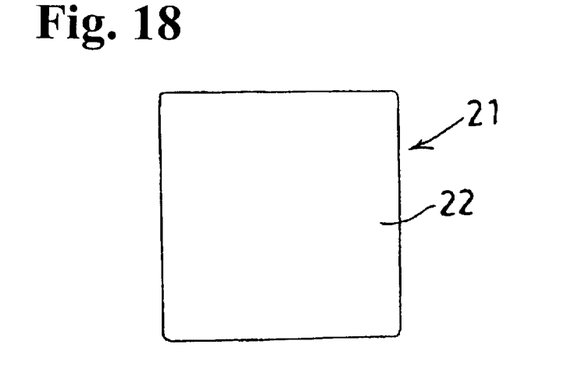
FIG. 18 is a left side view of the clamp main body shown in FIG. 1.
Figure 19:
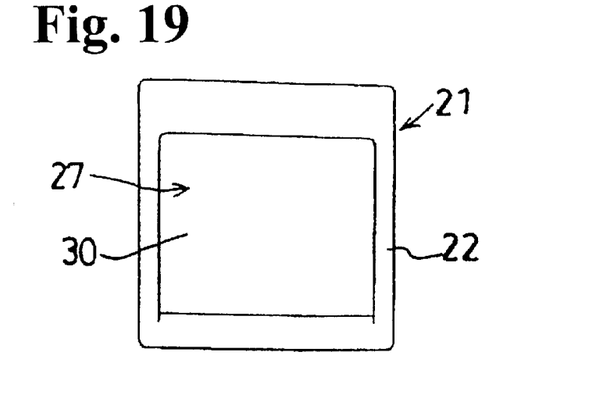
FIG. 19 is a right side view of the clamp main body shown in FIG. 1.
Figure 20:
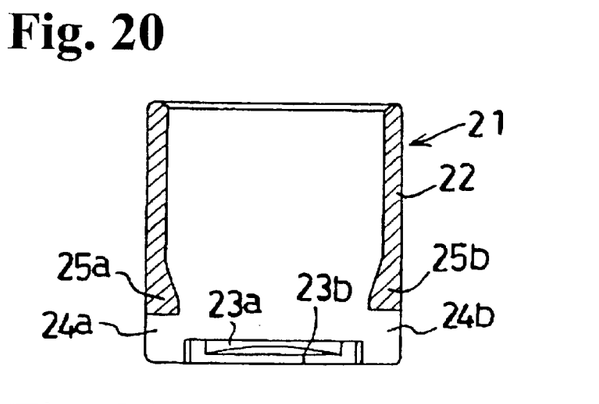
FIG. 20 is a sectional view taken along line 20—20 in FIG. 16.

FIG. 14 is a plan view of the clamp main body shown in FIG. 1, FIG. 15 is a partially cut front view thereof, FIG. 16 is a back view thereof, FIG. 17 is a bottom view thereof, FIG. 18 is a left side view thereof, FIG. 19 is a right side view thereof, and FIG. 20 is a sectional view taken along line 20—20 in FIG. 16.

In these drawings, the clamp main body 21 is constituted by a receiving part 22 formed of a synthetic resin, for example a hard synthetic resin such as polypropylene or polyacetal, for receiving the clip main body 1, and a holding part 27 disposed on one side surface of the receiving part 22 for holding pipes P, i.e. tubular objects.

As shown in FIG. 14, FIG. 15, FIG. 17, and FIG. 20, the above-mentioned receiving part 22 is formed in a box shape without a ceiling for engaging the clip main body 1. A hole 23a, through which the stud bolt S (described later) passes, is provided in a center part of the bottom part concentrically with the hole 6a in the ceiling 6. Openings 24a, 24b are provided on the two sidewall parts 4, 5 from edges to face each other at the bottom part. The openings allow a part of the vibration-proofing member 10, that is, the leg parts 11a, 11b, to pass therethrough to project outward. The openings also have non-escape engagement claws 25a, 25b, which engage the clip main body 1 so as not to come out from the receiving part 22, on the two sidewall parts 4, 5. Furthermore, a positioning engaging slot 26 is provided on an inner surface of the sidewall part corresponding to the rail 12 for engaging the rail 12.

Also, the holding part 27 is constituted such that three clamp parts 28, 29, 30 are connected away from the receiving part 22 for holding a plurality, for example three, of pipes P with the same diameter at a specified pitch.

Also, the respective clamp parts 28, 29, 30 are formed of receiving parts 28a, 29a, 30a having cylindrical concave parts for holding the pipes P, and non-escape engagement pieces 28b, 29b, 30b for holding the pipes P held in these receiving parts 28a, 29a, 30a so as not to come out from the receiving parts 28a, 29a, 30a.

On an outside of the bottom part of the receiving part 22, that is, a side abutting the vehicle body B, a receiving recessed part 23b is provided for receiving a part of the stud bolt S in a non-contact state.

Figure 21:
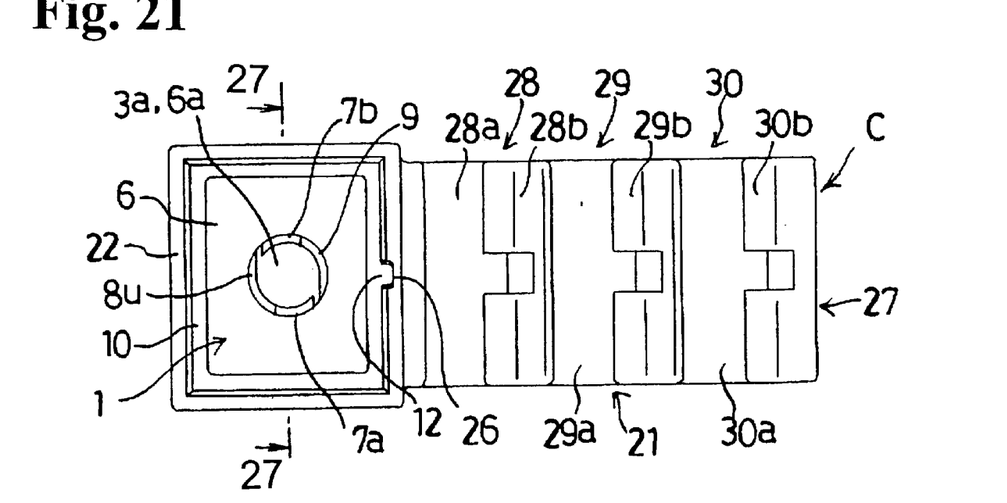
FIG. 21 is a plan view of the clamp shown in FIG. 1 in an assembled state.
Figure 22:
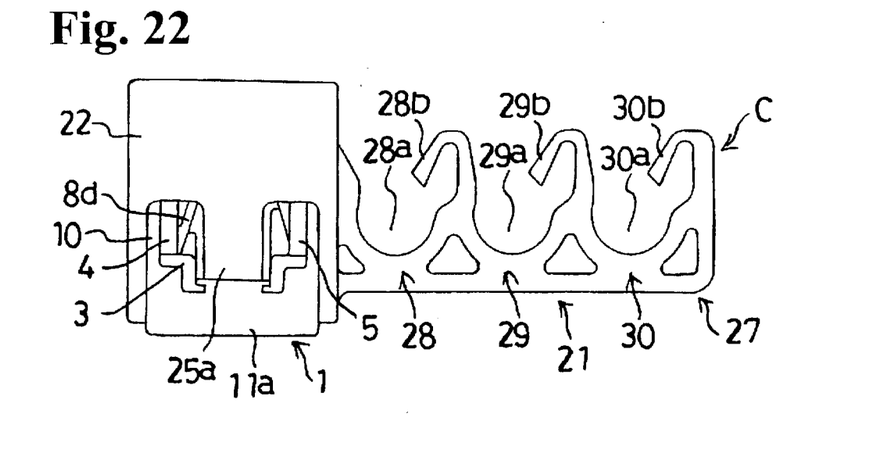
FIG. 22 is a front view of the clamp shown in FIG. 1 in the assembled state.
Figure 23:
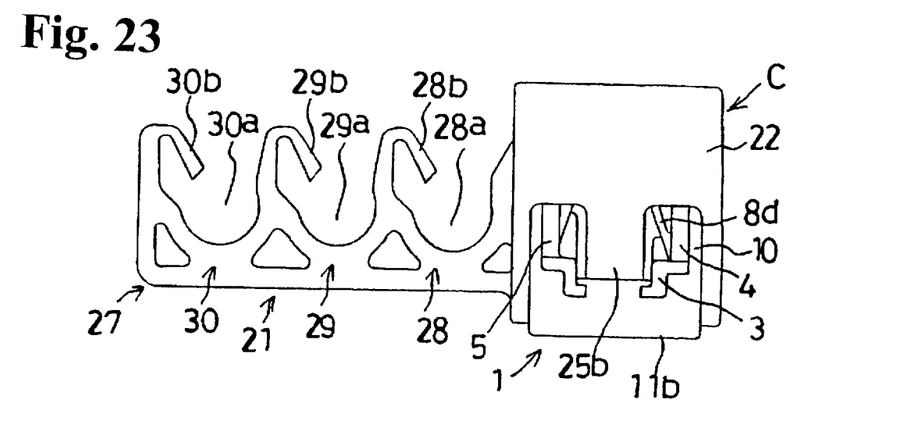
FIG. 23 is a rear view of the clamp shown in FIG. 1 in the assembled state.
Figure 24:
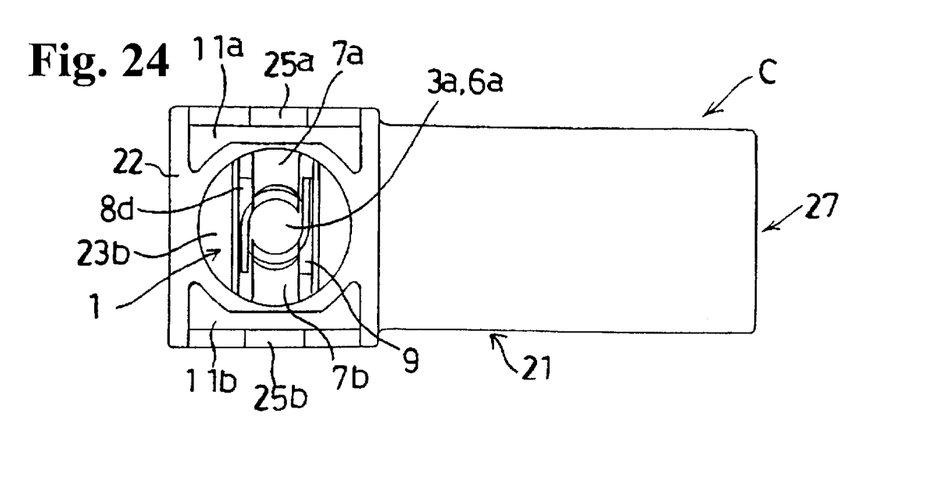
FIG. 24 is a bottom view the clamp shown in FIG. 1 in the assembled state.
Figure 25:
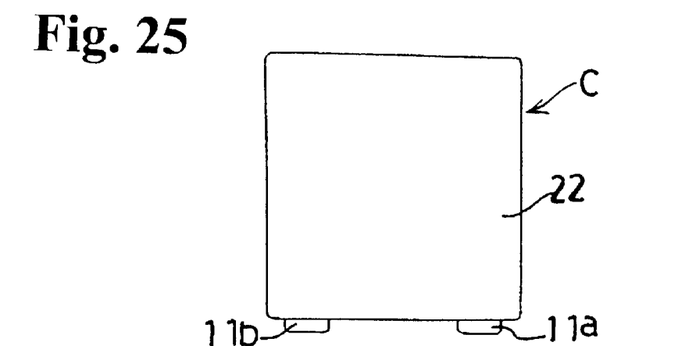
FIG. 25 is a left side view of the clamp shown in FIG. 1 in the assembled state.
Figure 26:
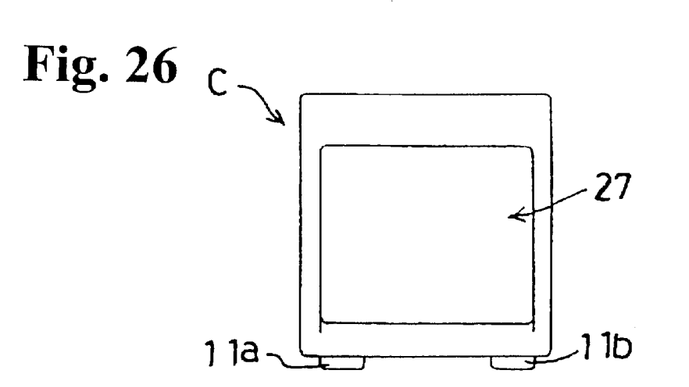
FIG. 26 is a right side view of the clamp shown in FIG. 1 in the assembled state.
Figure 27:
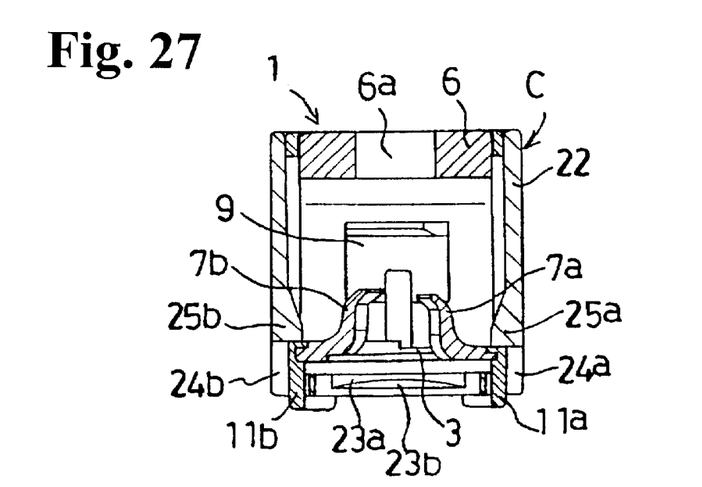
FIG. 27 is a sectional view taken along line 27—27 in FIG. 21.
Figure 28:
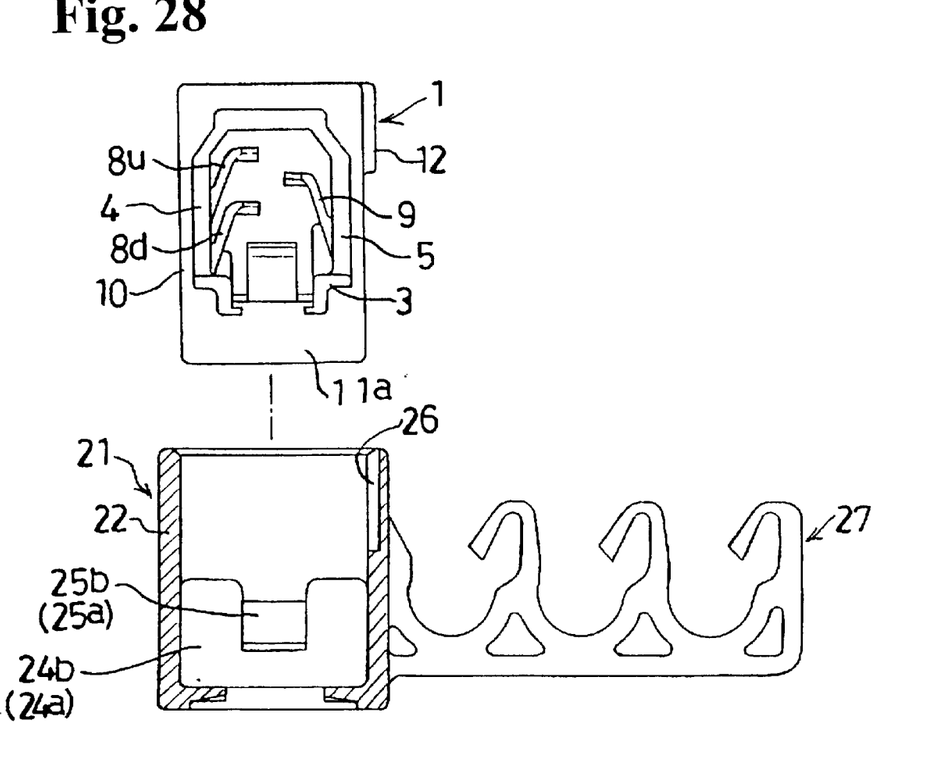
FIG. 28 is a drawing for explaining an assembly of the clamp.
Figure 29:
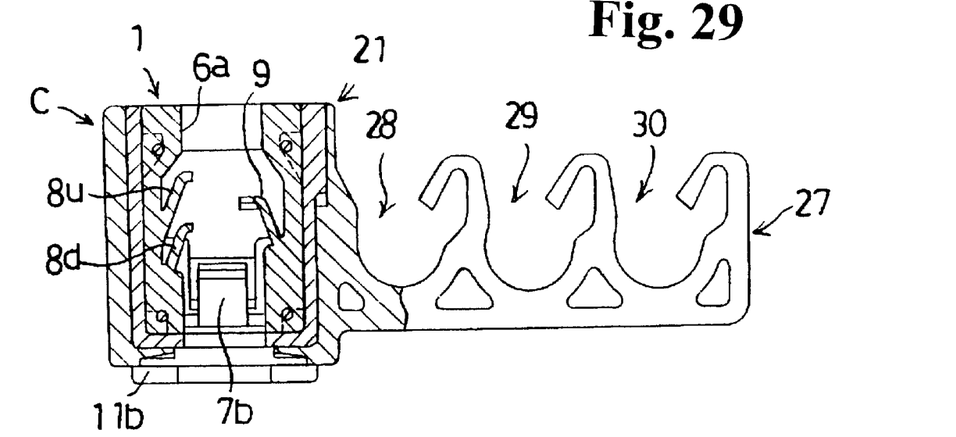
FIG. 29 is a drawing for explaining the assembly of the clamp.

FIG. 21 is a plan view of the assembled state of the clamp shown in FIG. 1, FIG. 22 is a front view thereof, FIG. 23 is a back view thereof, FIG. 24 is a bottom view thereof, FIG. 25 is a left side view thereof, and FIG. 26 is a right side view thereof. FIG. 27 is a sectional view taken along line 27—27 in FIG. 21, and FIG. 28 and FIG. 29 are drawings for explaining assembly of the clamp.

Next, assembly of the clamp C is explained. First, as shown in FIG. 28, with a side of the respective leg parts 11a, 11b of the clip main body 1 down, the rail 12 is placed to correspond to the positioning engaging slot 26 of the clamp main body 21, and a bottom side of the clip main body 1 is inserted into the receiving part 22. As a result, the rail 12 engages the positioning engaging slot 26, and the respective non-escape check claws 25a, 25b are pressed by the leg parts 11a, 11b and the bottom part 3 to expand by their own elasticity.

The respective leg parts 11a, 11b protrude from the corresponding openings 24a, 24b, and the vibration-proofing member 10 beneath the bottom part 3 is pressed against the bottom part of the receiving part 22. Accordingly, the bottom part 3 passes through the respective non-escape engagement claws 25a, 25b, and the respective non-escape engagement claws 25a, 25b return to the original state by their own elasticity. Therefore, they enter into the clip main body 1 from the openings between the sidewall parts 4, 5, and engage the upper side of the bottom part 3 through the vibration-proofing member 10. Thus, the clip main body 1 is received inside the receiving part 22 without escaping, and the clamp C is assembled as shown in FIG. 29.

As described above, the clamp C can be assembled by storing the clip main body 1 in the receiving part 22 of the clamp main body 21. Thus, even if the diameter and pitch of the pipes P change, the clamp C can be adjusted by selecting the clamp main body 21 fitting the diameter and pitch of the pipes P and installing the clip main body 1 in the receiving part 22 of this selected clamp main body 21.

Accordingly, even if the diameter and pitch of the pipes P change, the clip main body 1 is made as a common component, and the clamp main body 21 is made according to the pipes. Thus, the desired clamp C can be provided inexpensively.

Also, the vibration-proofing member 10 is provided on the outer perimeter of the attaching part 2, so that the attaching part 2 no longer contacts the clamp main body 21. That is, because the vibration-proofing member 10 is interposed between the attaching part 2 and the clamp main body 21, the vibrations of the attaching part 2 are no longer transmitted to the clamp main body 21, and an assured vibration-proofing effect is obtained.

Furthermore, the vibration-proofing member 10 is integrated with the outer perimeter of the attaching part 2, so that the vibration-proofing member 10 no longer comes off from the attaching part 2 when handling the clip main body 1. Thus, handling of the clip main body 1 becomes easier, and the clamp C assembly operation can be performed efficiently with good workability.

Figure 30:
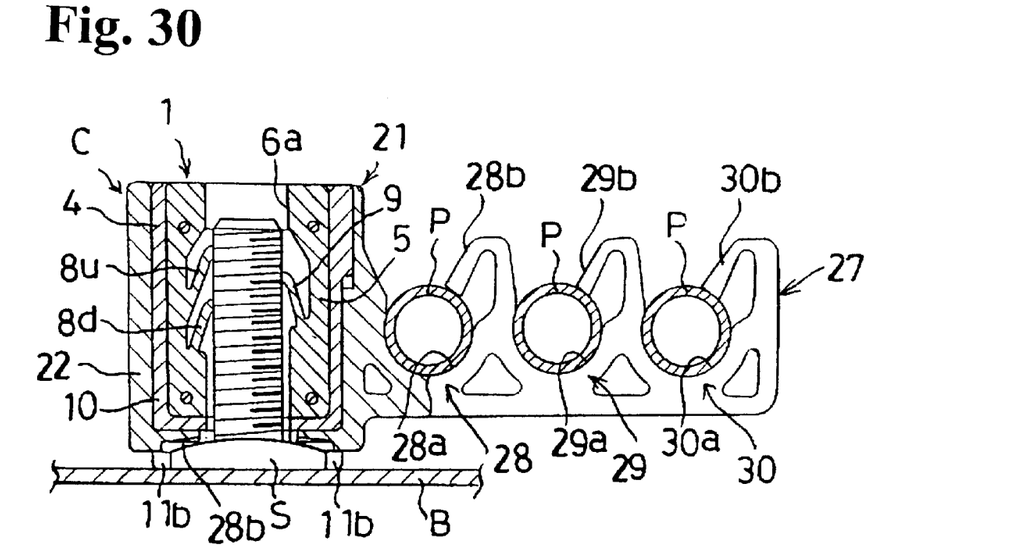
FIG. 30 is a drawing for explaining a state in which the clamp shown in FIG. 21 to FIG. 28 is attached to a vehicle body and pipes are held.

FIG. 30 is an explanatory drawing of a state in which the clamp shown in FIG. 21 to FIG. 28 is attached to a vehicle body to hold the pipes.

In FIG. 30, a stud bolt S for attaching the clamp C is fixed to the automobile body B by welding as the attachment-receiving member. Also, the pipes P as the tubular objects are those of concentrated piping for supplying, for example, fuel, oil, air, or the like.

Next, an example of attachment of the clamp C and fitting of the pipes P is explained. First, the hole 23a in the clamp C is placed to correspond with the tip of the stud bolt S attached to the vehicle body B, and the clamp C is pushed in toward the vehicle body B such that the tip of the stud bolt S is inserted into the hole 23a. As a result, the stud bolt S pushes the respective engagement claws 7a, 7b, 8u, 8d, 9, and the respective engagement claws 7a, 7b, 8u, 8d, 9 expand by their own elasticity.

When the leg parts 11a, 11b of the vibration-proofing member 10 protruding from the receiving part 22 abut against the vehicle body B, a flange part of the stud bolt S is received inside the receiving recessed part 23b in a non-contacting state with the receiving part 22. Then, the respective engagement claws 7a, 7b, 8u, 8d, 9 return to the original state by their own elasticity, and the respective tips engage a screw part of the stud bolt S.

Accordingly, even if it is tried to pull out the clamp C from the stud bolt S, because the respective engagement claws 7a, 7b, 8u, 8d, 9 engage the screw part of the stud bolt S, the clamp C is not pulled out from the stud bolt S.

In a state in which the clamp C is attached to the vehicle body B via the stud bolt S, the respective pipes P corresponding to the respective clamp parts 28–30 are pushed into the respective receiving parts 28a–30a with pressing against the respective non-escape engagement pieces 28b–30b. Thus, the respective non-escape engagement pieces 28b–30b bend by their own elasticity, so that the respective pipes P can be pushed into the respective receiving parts 28a–30a.

Also, when the respective pipes P are received inside the respective receiving parts 28a–30a, the respective non-escape engagement pieces 28b–30b return to the original state by their own elasticity to abut against the upper sides of the respective pipes P, thereby preventing the respective pipes P from escaping from the respective receiving parts 28a–30a.

As described above, the clamp C contacts the vehicle body B with the leg parts 11a, 11b of the vibration-proofing member 10 protruding from the receiving part 22. That is, the receiving part 22 does not directly contact the vehicle body B. Therefore, the vibrations of the vehicle body B are not transmitted to the pipes P via the clamp main body 1, and an assured vibration-proofing effect can be obtained.

Figure 31:
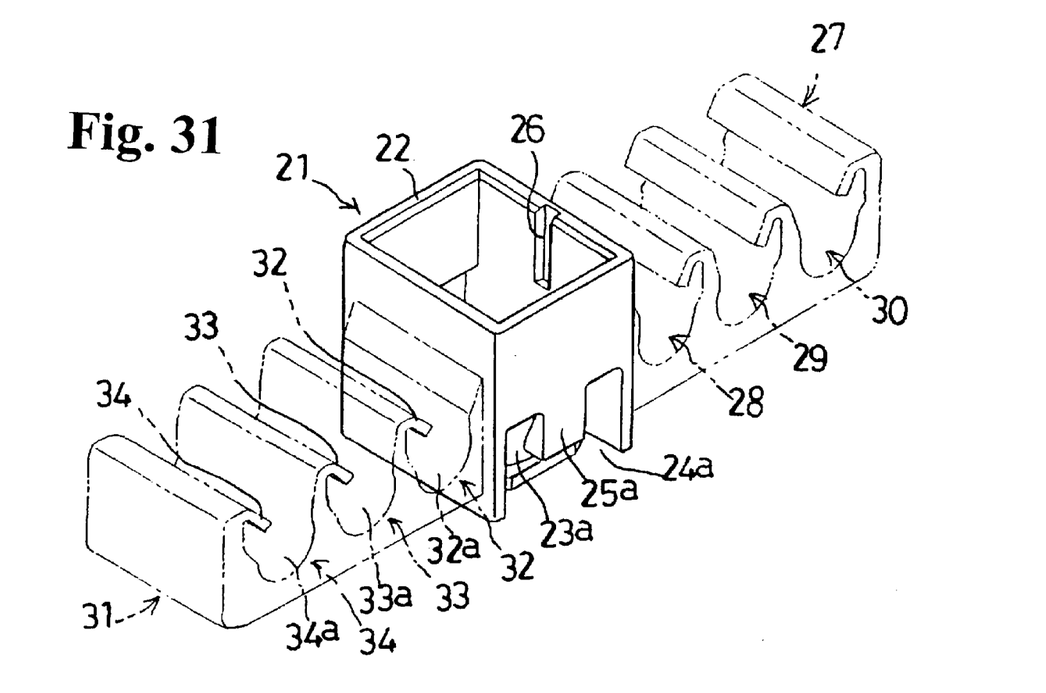
FIG. 31 is a drawing showing another example of the clamp main body.

FIG. 31 is an explanatory drawing showing another example of the clamp main body, and the same or corresponding parts in FIG. 1 and FIG. 14 to FIG. 30 are assigned with the same symbols.

In FIG. 31, like the holding part 27, the holding part 31 is attached on the side surface on the opposite side on which the holding part 27 of the receiving part 22 is attached. It is constituted such that three clamp parts 32, 33, 34 are connected away from the receiving part 22 for holding three pipes P of the same diameter at a specified pitch. The respective clamp parts 32, 33, 34 are constituted by receiving parts 32a, 33a, 34a having cylindrical concave parts for holding the pipes P, and non-escape engagement pieces 32b, 33b, 34b for holding the pipes P held in these receiving parts 32a, 33a, 34a so as not to come out from the receiving parts 32a, 33a, 34a. Since two holding parts 27, 31 are provided, more pipes P can be held.

In the above embodiments, the pipes P as tubular objects are assumed to have the same diameter. However, it is possible that the clamp main body 21 has a holding part for holding pipes P with different diameters at different pitches. The clamp main body may have one or two holding parts, and there also may be more than one clamp part.

As mentioned above, the number of the holding parts and clamp parts is arbitral. Thus, the receiving part 22 is the fundamental component of the clamp main body 21 as shown by the solid line in FIG. 31, and the holding parts and the clamp parts may be provided in an optional number as shown by the phantom line.

Also, the vibration-proofing member 10 is integrated with the outer perimeter of the attaching part 2. However, even if it is made removable with respect to the attaching part 2, the same effect can be obtained. Therefore, the vibration-proofing member 10 also may be constituted so as to be attachable and removable with respect to the attaching part 2. Furthermore, the vehicle body B is used as an example of the attachment-receiving part. However, it also may be another attachment-receiving part, for example a wall, or another part.

According to the invention, the clamp can be assembled by housing the clip main body in the receiving part of the clamp main body. Thus, even if the diameter and pitch of the tubular objects change, the clamp can be used by selecting a clamp main body fitting the diameter and pitch of the tubular objects and housing the clip main body in the receiving part of the selected clamp main body.

Accordingly, even if the diameter and pitch of the tubular objects change, the clip main body is used as a common component and only the clamp main body is changed, so that the desired clamp can be provided inexpensively.

Also, the vibration-proofing member is provided on the outer perimeter of the attaching part. Thus, the attaching part no longer contacts the clamp main body, and therefore the vibrations of the attaching part are no longer transmitted to the clamp main body. Also, since the clamp contacts the attachment-receiving member with a part (foot part) of the vibration-proofing member protruding from the receiving part, an assured vibration-proofing effect is obtained.

Furthermore, the vibration-proofing member is integrated with the outer perimeter of the attaching part. Thus, the vibration-proofing member no longer comes off from the attaching part when handling the clip main body, so that handling of the clip main body becomes easier, and the clamp assembly operation can be performed efficiently with good workability.

While the invention has been explained with reference to the specific embodiments of the invention, the explanation is illustrative and the invention is limited only by the appended claims.

What is claimed is:

1. A clamp for attaching a tubular object to an attachment-receiving member with a projection, comprising:

a clip main body having an attaching part for attaching to the projection of the attachment-receiving member, a clamp main body having a receiving part for receiving the clip main body and a holding part for holding the tubular object, and a vibration-proofing member formed of a soft material and disposed between an outer perimeter of the attaching part of the clip main body and the receiving part, said vibration-proofing member having a leg portion protruding outwardly from the clip main body and the receiving part so that when the clip main body is attached to the attachment-receiving member, the attaching part engages the projection, and the leg portion contacts the attachment-receiving member to thereby reduce transmission of vibration of the attachment-receiving member to the clamp main body.

2. A clamp according to claim 1, wherein said vibration-proofing member is integrally formed with the attaching part to substantially entirely cover the attaching part without interruption.

3. A clamp according to claim 2, wherein said receiving part includes openings provided on a side facing the attachment-receiving member so that the leg portion of the vibration-proofing member protrudes from the openings to abut against the attachment-receiving member.

4. A clamp according to claim 3, wherein said attaching part includes a pair of sidewalls facing each other, a bottom wall for connecting lower ends of the sidewalls having a hole, a ceiling wall for connecting upper ends of the sidewalls, and side openings arranged perpendicularly to the sidewalls.

5. A clamp according to claim 4, wherein said receiving part includes four side portions to form a hollow portion for receiving the attaching part and the vibration-proofing member therein, and claws formed at two of the side portions thereof to project inside the hollow portion, said claws being disposed in the side openings when the attaching part is inserted into the hollow portion.

6. A clamp according to claim 5, wherein said attaching part further includes engagement claws formed around the hole for engaging the projection of the attachment-receiving member.

7. A clamp according to claim 6, wherein said vibration-proofing member is formed on the periphery of the attaching part contacting the receiving part.

8. A fixing method for fixing a tubular object to an attachment-receiving member with a projection, comprising the steps of:

preparing a clip main body with a vibration-proofing member formed thereon, said vibration-proofing member being formed of a flexible material and having a leg portion projecting outwardly from the clip main body, selecting a clamp main body having a holding part that fits the tubular object, housing the clip main body in a receiving part provided in the clamp main body to assemble a clamp so that the vibration-proofing member is located between the clip main body and the clamp main body and the leg portion projects outwardly from the clamp, attaching an attaching part provided in the clip main body to the projection of the attachment-receiving member so that the attaching part engages the projection, and the leg portion contacts the attachment-receiving member to thereby reduce transmission of vibration of the attachment-receiving member to the clamp main body, and fixing the tubular object to the holding part of the clamp main body.

9. A fixing method according to claim 8, wherein said step of preparing the clip main body includes a step of integrally forming the vibration-proofing member on the attaching part.

10. A fixing method according to claim 8, further comprising a step of providing openings at a side of the receiving part facing the attachment-receiving member so that the leg portion of the vibration-proofing member protrudes from the openings to abut against the attachment-receiving member when the clamp is assembled.

11. A clamp according to claim 1, wherein said vibration-proofing member includes two leg portions on two sides thereof.

* * * * *